Figure 1:
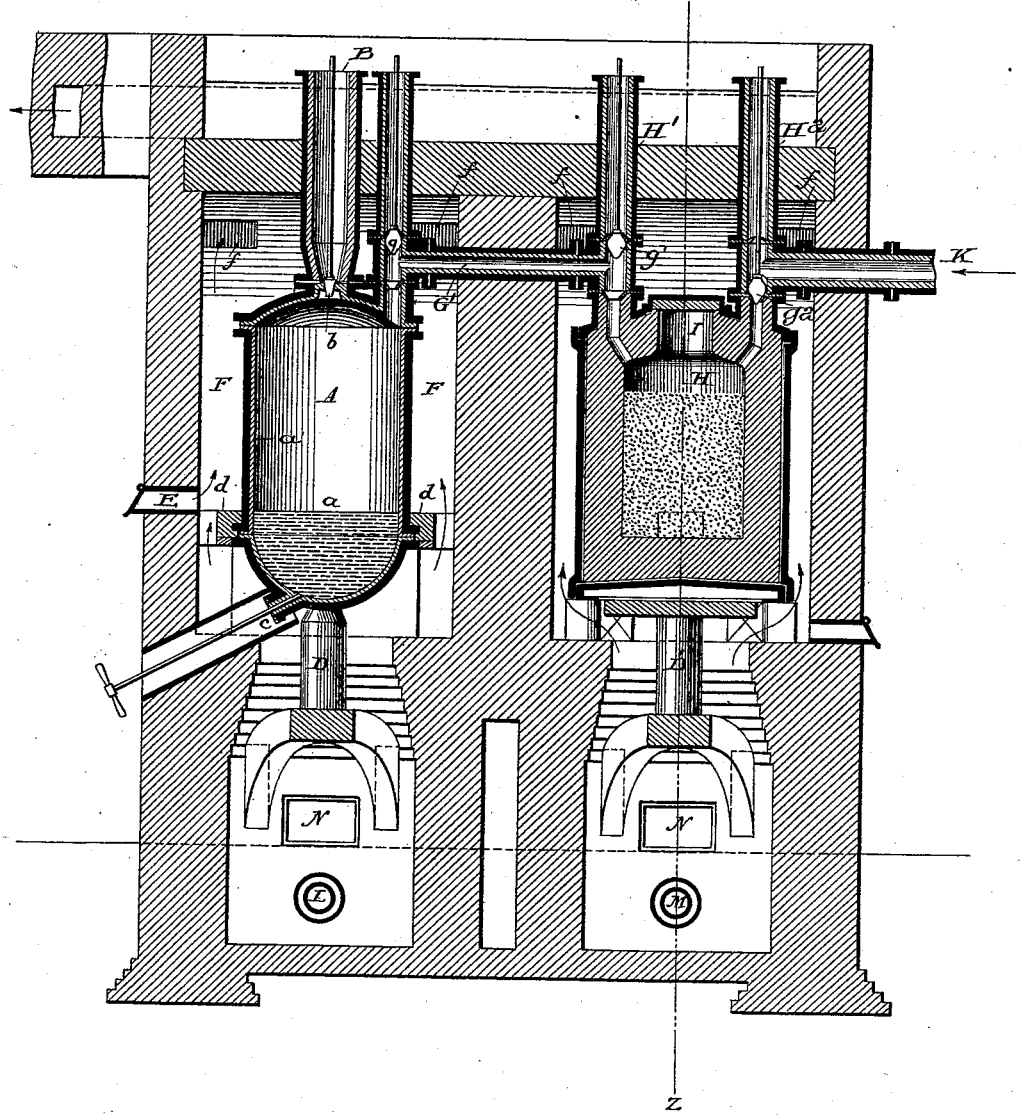

(No Model.) 2 Sheets—Sheet 1.

L. MOND.
PROCESS OF OBTAINING CHLORIN.

No. 529,130. Patented Nov. 13, 1894.

Witnesses
Raymond F. Barnes.
N. R. Kennedy.

Inventor
Ludwig Mond
By C. T. Dodge
Attorney

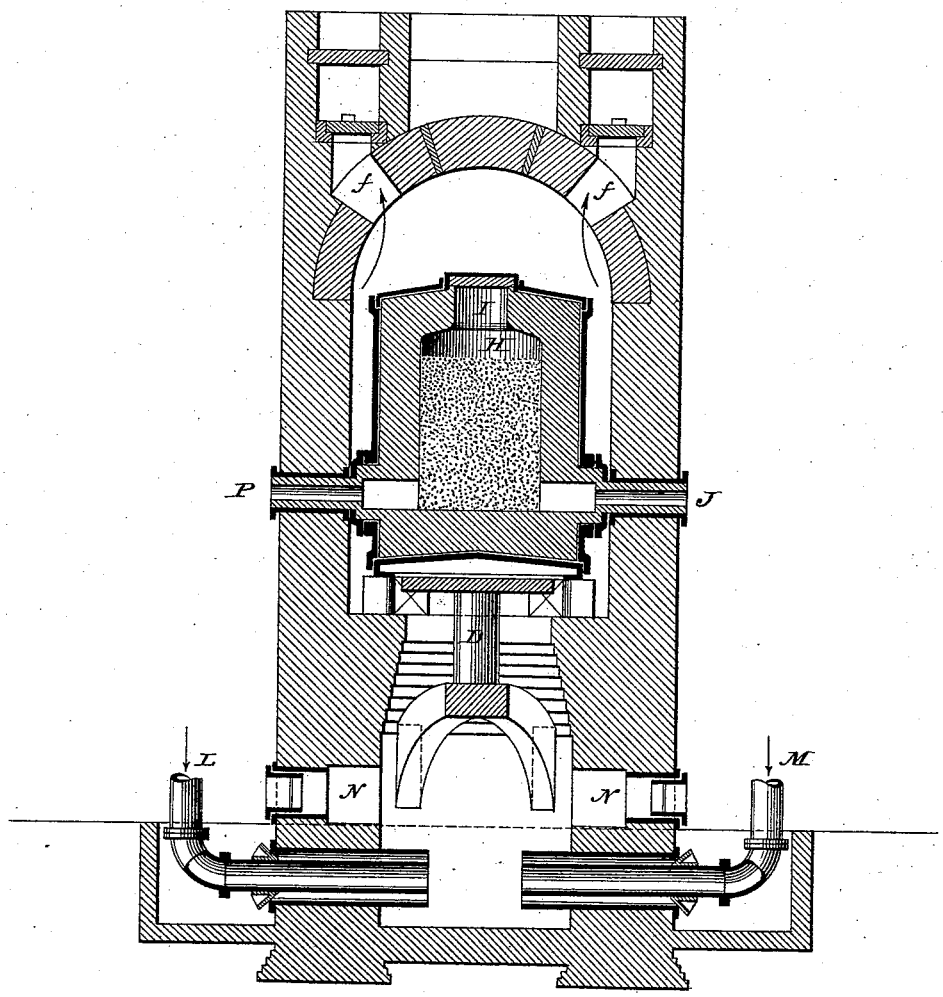

UNITED STATES PATENT OFFICE.

LUDWIG MOND, OF NORTHWICH, ENGLAND.

PROCESS OF OBTAINING CHLORIN.

SPECIFICATION forming part of Letters Patent No. 529,130, dated November 13, 1894.

Application filed July 6, 1893. Serial No. 479,716. (No specimens.) Patented in England February 13, 1889, No. 2,575.

*To all whom it may concern:*

Be it known that I, LUDWIG MOND, manufacturing chemist, a subject of the Queen of Great Britain, residing at Northwich, in the county of Chester, Kingdom of England, have invented certain new and useful Improvements in Processes of Obtaining Ammonia and Chlorin from Ammonia Chlorid, (for which I have obtained Letters Patent in England, No. 2,575, dated February 13, 1889,) of which the following is a specification.

Ammonium chloride is vaporized in a still or retort made of or lined with antimony and (heated on the outside) which is set into a suitable furnace in such a way that only the lower part of the still is exposed to the full heat of the furnace. This still is filled with zinc chloride to such an extent that when the chloride is melted it fills the still a little higher than the portion exposed to the full heat of the furnace. I introduce the ammonium chloride through a suitable hopper or feeder into this still in small quantities or continuously, and allow it to drop on the molten zinc chloride and thus obtain a very rapid vaporization. Those parts of the still which are not exposed to the full heat of the furnace must be kept at a temperature above 350° centigrade, so that the volatilized ammonium chloride is not condensed again.

In order to make a strong and durable apparatus and to save antimony, I prefer to make the still of cast iron, and to line it on the inside with antimony or an alloy of antimony, in which this metal so largely predominates that it will resist the corrosive action of the substances named, sufficiently for practical purposes. The vapor of ammonium chloride produced in this still, I take through conduits, by preference constructed of cast iron lined with antimony or with earthenware tiles, and which are also kept heated above 350° centigrade, into vertical cylinders which contain the oxide or salt to be acted upon.

Of the numerous substances that can be used for the process, I prefer a mixture of chloride magnesia with a certain quantity of chloride of potassium. I have found it convenient to add to these substances a certain quantity of china clay and also a little lime or chloride of calcium. The magnesia used should not be too dense. I find the product obtained by precipitation with milk of lime from natural brine or sea water or other salt containing chloride of magnesium, subsequent settling and washing, preferably by means of filter presses, and then exposing to a moderate heat to expel the water of hydration, very suitable for my purpose. I have obtained good results by adding to every one hundred parts of magnesia seventy-five parts of china clay and six parts of quicklime. I mix these substances thoroughly and then grind them in a suitable mill, with the addition of a solution of chloride of potassium of 17° to 20° Twaddle, in sufficient quantity to obtain a thick paste. Of this paste I make small round balls or pills of about half an inch diameter, by means of suitable machinery. These pills are dried carefully and then heated to a low red heat. For the drying, I prefer to use a traveling band passing through a heated chamber and for the subsequent heating a vertical iron retort working continuously. In this way very hard pills are obtained, which will stand the repeated chloridizing and oxidizing for a long time. These pills are filled into these cylinders named above to a convenient height, say six to eight feet, and rest on a false bottom or on a layer of broken bricks or of pills of the same material, but of larger size than the rest of the pills. The apparatus I use for this purpose is patented in United States Patent No. 491,741.

Previous to introducing any ammonium chloride vapor into the cylinders, I pass a current of hot inert gas through them, so as to raise the temperature of the pills inside the cylinders to about 350° centigrade. When this temperature has been reached the hot gas is shut off and chloride of ammonium vapor passed in, in such quantity and at such a speed as the quantity of pills will allow. The ammonia formed is taken from the bottom of the cylinder to a convenient absorbing apparatus. When sufficient ammonium chloride has been passed through, the valves or plugs admitting it are shut off and a current of inert gas previously heated to a temperature of 500° to 550° centigrade is now passed through the cylinders. For a certain time, this gas on leaving the bottom of the cylinders carries with it a certain quantity of ammonia, and is passed through a suitable washing apparatus for absorbing this ammonia. When the ammonia ceases, the gas carries with it a certain quantity of hydrochloric acid. As soon as this appears the gas is turned through a different set of conduits into a suitable apparatus for absorbing this hydrochloric acid. When all the hydrochloric acid is driven out of the cylinders, the pills have generally arrived at a temperature of 500° to 550° centigrade. If not, the current of hot inert gas is continued until this temperature is reached. The inert gas used for this purpose must be as far as possible free from oxygen and vapor of water, in order that it shall not itself act upon the chloride of magnesium in the pills. The gases obtained from a well conducted lime-kiln and the gases escaping from the absorbing columns used in the ammonia soda process are, if the necessary precautions are taken to keep these gases as free as possible from oxygen, quite suitable for this purpose, more particularly after carefully drying them by means of strong sulphuric acid. When the pills have arrived at the temperature above named (500° to 550° centigrade) the current of inert gas is stopped and a current of hot air introduced. The air is previously carefully dried by contact with strong sulphuric acid and then heated to a temperature of 800° to 1,000° centigrade by preference by means of a Cowper stove. Air at this temperature decomposes the chloride of magnesium very readily and quickly, and on leaving the bottom of the cylinders it contains from seven to ten per cent. of chlorine, which is practically free from hydrochloric acid, if the previous operation has been carefully conducted, and can, after cooling in cast iron pipes be directly introduced into suitable apparatus such as a Deacon bleaching powder chamber for the absorption of dilute chlorine gas by lime.

Toward the end of the operation, the gas becomes weak in chlorine. I then pass this gas through a Cowper stove or other suitable heating apparatus to heat it up again to 800° to 1,000° centigrade, and take it through another cylinder ready for the production of chlorine. In this way I keep the chlorine gas which goes to the bleaching powder chamber at a reasonable strength. When the chlorine has been driven out as far as is desirable, I pass cold air through the cylinders in order to reduce the temperature of the pills again to about 400° centigrade. This cold air gets heated in its passage through the hot pills, and is also passed from the cylinders to a Cowper stove or other heating apparatus to be heated up further and then to be used for liberating chlorine in another cylinder.

In place of cold air, I may use cold inert gases and employ these subsequently for heating up the pills in another cylinder. When the temperature of the pills has been sufficiently reduced, the cold air or inert gas is shut off, the ammonium chloride vapor again admitted and the cycle of operations repeated as before described.

For a better understanding of my invention reference may be had to the accompanying drawings, which illustrate an apparatus adapted to carry out my process.

Figure 1 represents a vertical section through the entire apparatus, and Fig. 2 a vertical section on the line $y-z$ in Fig. 1.

A designates the retort or still located in a suitable heating chamber F in which it is sustained by a central support D and side supports $d$. This retort is preferably made of cast iron and provided with an antimony lining $a'$.

B is a hopper provided with a valve $b$ for supplying solid ammonium chloride to the still as required. The retort is preferably heated by producer gas which is supplied through a pipe L.

G designates a passage leading from the top of the retort and connected by a branch G' with the converter. In this passage G is located a vertically movable double cone valve $g$ which has seats both above and below the branch passage.

E is an air inlet for reducing temperature.

H designates the converter also located in a heating chamber and sustained therein by a central support D'. The converter, like the retort, is heated by producer gas supplied through a pipe M. From the top of the converter rise two pipes H' H$^2$, the first of these being connected with the branch pipe G' before referred to, and the second with a pipe K for the introduction of air or inert gas, as required. The pipes H', H$^2$ are also provided with valves $g'$, $g^2$ similar to the valve $g$, and with seats for said valves both above and below the connecting pipes G', K.

By the manipulation of valve $g$ the retort may be closed or the vapors generated therein allowed to pass toward the converting chamber. The valve $g'$ in its upper position as shown in the drawings directs the vapors from the retort into the converting chamber H while in its lower position it directs them past the converter through the upper portion of the pipe H'. The valve $g^2$ acts in like manner to direct into or past the converter the air or inert gases entering through the pipe K.

The converter H is provided at the bottom with oppositely opening outlets J, P, one for the escape of chlorine gases and the other for ammonical gases.

N, N designate manholes, and $f, f$, flues for the escape of the heating gases.

In practice the retort or still A is filled approximately to the level indicated by broken lines at $a$ with chloride of zinc which is fused, and maintained in a state of fusion, by the exterior application of heat. From time to time as required, the valve $b$ is opened to admit into the retort a supply of ammonium chloride.

The mode of action is as follows:—The molten zinc chloride and pills being placed in their respective vessels A and H and the requisite degree of temperature attained, ammonium chloride is introduced into the still and falling into the molten zinc chloride is speedily volatilized and its place from time to time supplied with further ammonium chloride till the pills are sufficiently chloridized. The ammonium chloride being vaporized in an antimony vessel arrives at the pill or converting chamber pure instead of being contaminated, as it would be if evaporated in any other vessel known to me, by the materials of the retort. When the pills are sufficiently chloridized, the vaporization of ammonium chloride is stopped by the supply of ammonium chloride being cut off or the vapor is diverted to a receiving chamber (not shown) through the pipes G', H' by closing down the valve $g'$. The valve $g^2$ is then raised to deliver hot air or inert gas into the converter H, which passing down through the mass of pills therein escapes at the bottom carrying with it the ammonia and hydrochloric acid, as already fully explained.

If it is desired to produce hydrochloric acid instead of chlorine, I use in place of hot air, superheated steam, and take the gases issuing from the cylinders to a suitable apparatus for condensing the hydrochloric acid formed.

I declare that what I claim is—

1. The process of obtaining chlorine from ammonium chloride which consists in heating to 350° centigrade balls or pills or fragments of oxide capable of decomposing the said ammonium chloride and of absorbing chlorine in place of oxygen, vaporizing the ammonium chloride in molten zinc chloride, protected from contamination with foreign matter by antimony, passing the ammonium chloride vapor through said balls, pills or fragments previously cleared of air and raised to about 350° centigrade by the passage of hot inert gases, till the power of said balls or fragments to take up chlorine is sufficiently spent, collecting the ammonia given off, then raising and regulating the heat of the pills by passing through them hot inert gas and saving what ammonia and afterward hydrochloric acid are given off, then passing dry hot air through and thus liberating the chlorine previously absorbed, utilizing the chlorine so obtained by passing it into bleaching powder chambers or otherwise and when the gases become too weak for this process utilizing them in a previous step of the process, then again lowering the temperature of the pills by passing through cold air or cold inert gas and when the requisite temperature has arrived, recommencing the cycle of operations by passing the ammonium chloride vapor through, substantially as described.

2. The improvement in the process of obtaining chlorine and ammonia from ammonium chloride which consists in vaporizing ammonium chloride by contact with fused chloride of zinc whereby vessels incapable of being safely heated to a high degree of heat can be used and the heat more quickly given to the ammonium chloride and all chances of dis-associating the component atoms of the ammonia are avoided.

3. The improvement in the way of manufacturing chlorine from ammonium chloride which consists in inclosing or insulating the same by antimony and subjecting the same while thus insulated to a heat sufficient to cause evaporation, whereby ammonium chloride is prevented from contamination or decomposition.

4. The improvement in the manufacture of chlorine which consists in passing the vapor of ammonium chloride through heated balls or fragments formed of magnesia, clay, lime and potassium chloride substantially as described.

5. The improvement in the process of obtaining chlorine from ammonium chloride by means of repeated chloridation and oxidation of certain mineral matters by their alternate exposure when heated to the vapor of ammonium chloride and to air, heating to about 900° centigrade the air which is only weakly charged with chlorine, (near the end of the process) and passing it through another bath of chloridized salts, whereby the very diluted chlorine otherwise useless is saved and goes to enrich a subsequent process.

6. The improvement in the process of obtaining chlorine which consists in charging a suitable mineral absorbent with chloride, of ammonium vapor, and then exposing the charged absorbent to air, heated to say 900° to 1,000° centigrade whereby the formation of the chlorine is effected without the use of external heat.

In testimony whereof I have signed my name to this specification in the presence of two subscribing witnesses.

LUDWIG MOND.

Witnesses:
WILMER M. HARRIS,
THOMAS LAKE.